US010746304B2

(12) United States Patent
Haas et al.

(10) Patent No.: US 10,746,304 B2
(45) Date of Patent: Aug. 18, 2020

(54) FACE SEAL ASSEMBLY FOR MACHINE SYSTEM HAVING METALLIC SEALING RING WITH STIFFNESS RELIEF GROOVE TO COMPENSATE FOR OUT-OF-PLANE SEALING FACE

(71) Applicant: Caterpillar Inc., Deerfield, IL (US)

(72) Inventors: Connor Haas, New Braunfels, TX (US); Daniel Mathien, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 132 days.

(21) Appl. No.: 16/159,086

(22) Filed: Oct. 12, 2018

(65) Prior Publication Data

US 2020/0116261 A1    Apr. 16, 2020

(51) Int. Cl.
  *F16J 15/34*    (2006.01)
  *F16J 15/00*    (2006.01)
  *B62D 55/15*    (2006.01)

(52) U.S. Cl.
  CPC .......... *F16J 15/3472* (2013.01); *B62D 55/15* (2013.01); *F16J 15/002* (2013.01); *F16J 15/3404* (2013.01); *F16J 15/344* (2013.01); *F16J 15/3468* (2013.01)

(58) Field of Classification Search
  CPC .... F16J 15/3472; F16J 15/3404; F16J 15/344; F16J 15/3468; F16J 15/002; B62D 55/15
  See application file for complete search history.

(56) References Cited

U.S. PATENT DOCUMENTS 3,180,648 A * 4/1965 Kupfert ................. B62D 55/15
                                                          277/382
3,499,653 A * 3/1970 Gardner ............... F16J 15/3412
                                                          277/362
3,588,128 A * 6/1971 Petersen ............. F16J 15/3436
                                                          277/384

(Continued)

FOREIGN PATENT DOCUMENTS

CN         103556949 B     11/2015
CN         205118251 U      3/2016

(Continued)

OTHER PUBLICATIONS

WIPO Office, International Search Report for PCT/US2019/054758. Authorized Officer Evelyne Prouteau, Not yet published, Publisher will be WIPO Office, Entire Document.

*Primary Examiner* — Eugene G Byrd
(74) *Attorney, Agent, or Firm* — Brannon Sowers & Cracraft

(57) ABSTRACT

A face seal assembly includes a first and a second metallic sealing ring having a common center axis, and each including an outer ring surface and an inner ring surface. A non-metallic sealing element is positioned upon the outer ring surface. The metallic sealing ring also includes a sealing face facing an axially outward direction and extending circumferentially around the center axis in a path that varies from parallelism with a plane normal to the center axis. A stiffness relief groove extends inwardly from the inner ring surface and circumferentially around the center axis and forms an annular spring zone of reduced material thickness to compensate for the varying of the path of the sealing face. One machine system application includes a final drive in a ground-engaging machine.

19 Claims, 4 Drawing Sheets

(56) References Cited

U.S. PATENT DOCUMENTS

| | | | | |
|---|---|---|---|---|
| 3,767,214 A | * | 10/1973 | Kawamura | B62D 55/15 |
| | | | | 277/358 |
| 4,077,634 A | * | 3/1978 | Durham | F16J 15/344 |
| | | | | 277/382 |
| 4,087,100 A | * | 5/1978 | Yoshihashi | F16J 15/3416 |
| | | | | 277/382 |
| 4,327,921 A | * | 5/1982 | Reinsma | B60T 1/065 |
| | | | | 277/384 |
| 4,421,327 A | * | 12/1983 | Morley | F16J 15/344 |
| | | | | 277/381 |
| 4,489,952 A | * | 12/1984 | Ohtsuka | F16J 15/344 |
| | | | | 164/111 |
| 4,844,483 A | | 7/1989 | Iijima et al. | |
| 5,160,149 A | * | 11/1992 | Winn | F16J 15/3468 |
| | | | | 277/362 |
| 5,560,621 A | * | 10/1996 | Zutz | F16J 15/344 |
| | | | | 277/382 |
| 6,299,173 B1 | | 10/2001 | Lai | |
| 9,200,710 B2 | * | 12/2015 | Nishioka | F16J 15/3496 |
| 9,488,280 B2 | | 11/2016 | Critchley | |
| 9,656,707 B2 | | 5/2017 | Johannsen | |
| 9,951,872 B2 | | 4/2018 | Caterpillar | |
| 10,393,271 B2 | * | 8/2019 | Marchione | C23C 4/08 |
| 2007/0194537 A1 | * | 8/2007 | Lerchbaum | F16J 15/3496 |
| | | | | 277/404 |
| 2013/0285332 A1 | * | 10/2013 | Bishop | F16J 15/34 |
| | | | | 277/500 |
| 2014/0175753 A1 | * | 6/2014 | Antoine | F16J 15/344 |
| | | | | 277/358 |
| 2014/0197675 A1 | * | 7/2014 | Morman | F16J 15/3404 |
| | | | | 301/105.1 |

FOREIGN PATENT DOCUMENTS

| | | |
|---|---|---|
| EP | 1801471 A1 | 6/2007 |
| EP | 2916048 A1 | 9/2015 |

* cited by examiner

FACE SEAL ASSEMBLY FOR MACHINE SYSTEM HAVING METALLIC SEALING RING WITH STIFFNESS RELIEF GROOVE TO COMPENSATE FOR OUT-OF-PLANE SEALING FACE

TECHNICAL FIELD

The present disclosure relates generally to a face seal assembly for a machine system, and more particularly to a metallic sealing ring for a face seal assembly having a stiffness relief groove to compensate for an out-of-plane state of a sealing face.

BACKGROUND

Face seal assemblies are used in connection with a great variety of machinery components and machine systems with parts that rotate relative to one another. Typical example applications include track-type machines, namely, in track roller assemblies, idler assemblies, final drives, track pins, and potentially still others. Face seal assemblies are also known from the fields of pumps and compressors, and in a variety of industrial applications. Face seal assemblies commonly retain lubricants within a seal cavity and prevent intrusion of foreign debris and the like. Designs are known where lubricant is pressurized within the seal cavity, as well as applications where the seal cavity is at atmospheric pressure.

A typical face seal design can include a pair of contacting sealing rings that rotate relative to one another in face-to-face contact, with one of the sealing rings typically fixed relative to a first machine system component and the other of the sealing rings typically fixed relative to a second machine system component. A non-metallic sealing element, in some instances referred to as a "toric," can be compressed between the sealing rings and their respective components to assist in biasing the sealing rings against one another.

One face seal assembly is known from U.S. Pat. No. 9,656,707 to Johannsen. In the design of Johannsen, it appears that dissimilar sealing rings are held in face-to-face contact with non-metallic sealing elements that are also dissimilar to provide static seals between the sealing rings and seal housing members. While Johannsen may work well for intended purposes, improvements and alternative designs in face seal technology are welcomed by the industry.

SUMMARY OF THE INVENTION

In one aspect, a face seal assembly for a machine system includes a metallic sealing ring defining a center axis and including an axially extending body portion forming a first axial end of the metallic sealing ring, and a radially extending flange joined to the axially extending body portion and forming a second axial end of the metallic sealing ring. The metallic sealing ring further includes an outer ring surface and an inner ring surface each formed at least in part upon the axially extending body portion and extending circumferentially around the center axis. The outer ring surface has a first section forming a seal retention lip, and a second section extending between the first section and the radially extending flange. The face seal assembly further includes a non-metallic sealing element positioned upon the outer ring surface. The second axial end includes a sealing face facing an axially outward direction and extending circumferentially around the center axis in a path that varies from parallelism with a plane that is oriented normal to the center axis. A stiffness relief groove extends inwardly from the inner ring surface and circumferentially around the center axis and forms an annular spring zone of reduced material thickness in the body portion to compensate for the varying of the path of the sealing face.

In another aspect, a machine system includes a first machine component, and a second machine component rotatable relative to the first machine component. The machine system also includes a face seal assembly including a first metallic sealing ring, and a first non-metallic sealing element forming a first static seal between the first metallic sealing ring and the first machine component. The face seal assembly further includes a second metallic sealing ring, and a second non-metallic sealing element forming a second static seal between the second metallic sealing ring and the second machine component. Each of the first and the second metallic sealing rings includes an inner ring surface extending circumferentially around a center axis common to the first and the second metallic sealing rings, an outer ring surface, and a sealing face. The sealing faces of the first and the second metallic sealing rings extend circumferentially around the center axis and are in contact with one another so as to form a rotatable face seal. At least one of the first or the second metallic sealing rings has a stiffness relief groove formed in the corresponding inner ring surface that compensates for varying of paths of the sealing faces from parallelism with a plane that is oriented normal to the center axis.

In still another aspect, a metallic sealing ring for a face seal assembly in a machine system includes a body portion having an inner ring surface and an outer ring surface extending circumferentially around a center axis, and a flange joined to the body portion and extending radially outward from the body portion. The outer ring surface has a first section oriented at a first angle relative to the center axis that opens in a first axial direction away from the flange, and a second section extending between the first section and the flange and oriented at a second angle relative to the center axis that opens in a second axial direction toward the flange. A sealing face is formed on the flange, the sealing face facing the second axial direction and extending circumferentially around the center axis. A tapered wear face is adjacent to the sealing face, the tapered wear face extending circumferentially around the center axis. The metallic sealing ring further includes a stiffness relief groove extending inwardly from the inner ring surface and circumferentially around the center axis, such that an annular spring zone of reduced material thickness is formed in the body portion to compensate for varying in a path of the sealing face from parallelism with a plane that is oriented normal to the center axis.

DETAILED DESCRIPTION

Figure 1:
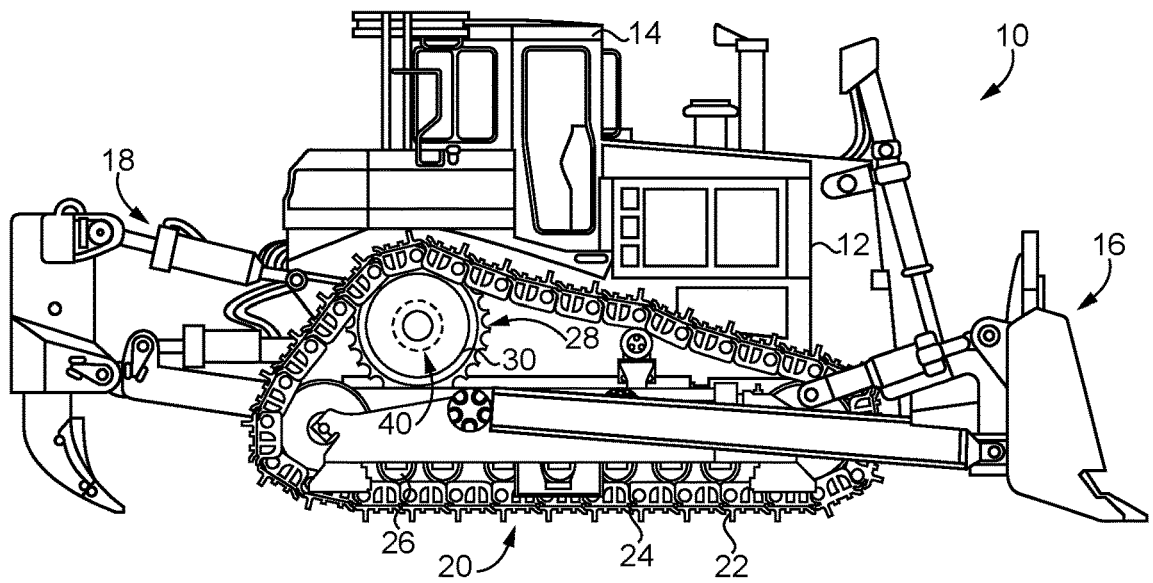
FIG. 1 is a side diagrammatic view of a machine, according to one embodiment.

Referring to FIG. 1, there is shown a machine 10, according to one embodiment, and illustrated in the context of a track-type tractor. Machine 10 can include a tractor, a backhoe, a wheel scraper, a motor grade, a truck, or a variety of other off-highway or on-highway machines, or a stationary machine. Machine 10 can further be understood in accordance with the present disclosure as a machine system and to include one or more subsystems themselves analogously understood as a machine system. Machine 10 further includes a frame 12, a front implement 16 such as a blade mounted at a front end of frame 12, and a back implement 18 such as a ripper mounted at a back end of frame 12. Machine 10 also includes a track system 20 including a ground-engaging track 22 having a plurality of track links (not numbered) coupled together in an endless chain. A substantially identical track is positioned at an opposite side of frame 12 from that shown. A plurality of track pins 24 and a plurality of track rollers 26 are also part of track system 20. Machine 10 also includes a final drive machine system 28 having a drive sprocket 30 illustrated in a so-called high drive configuration, although the present disclosure is not thereby limited. A machine system such as track system 20 and a machine system such as final drive system 28 can include components between or within which it is desirable to provide robust, rotatable fluid seals. Track pins, track rollers, track idlers, carrier rollers, and still other components within a track system or an altogether different machine system can include face seals structured according to the present disclosure, as further discussed herein.

Figure 2:
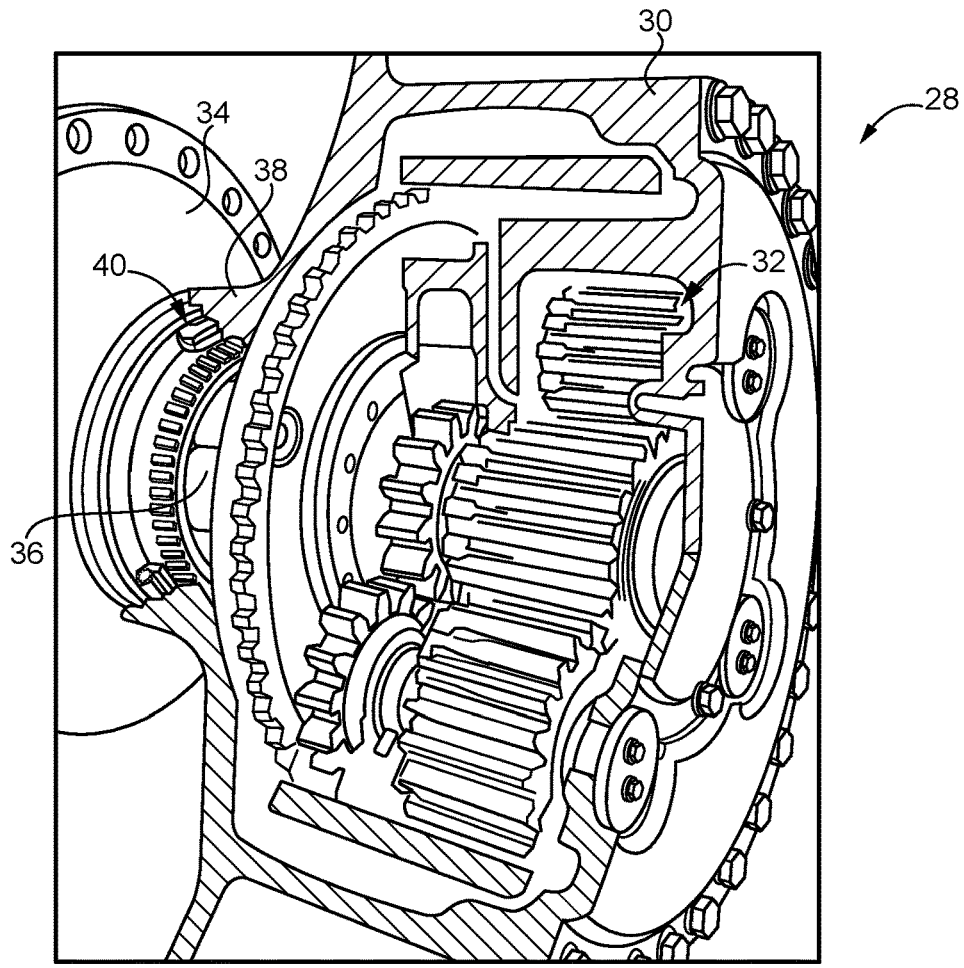
FIG. 2 is a sectioned view, in perspective, of a machine system in the machine of FIG. 1, according to one embodiment.
Figure 3:
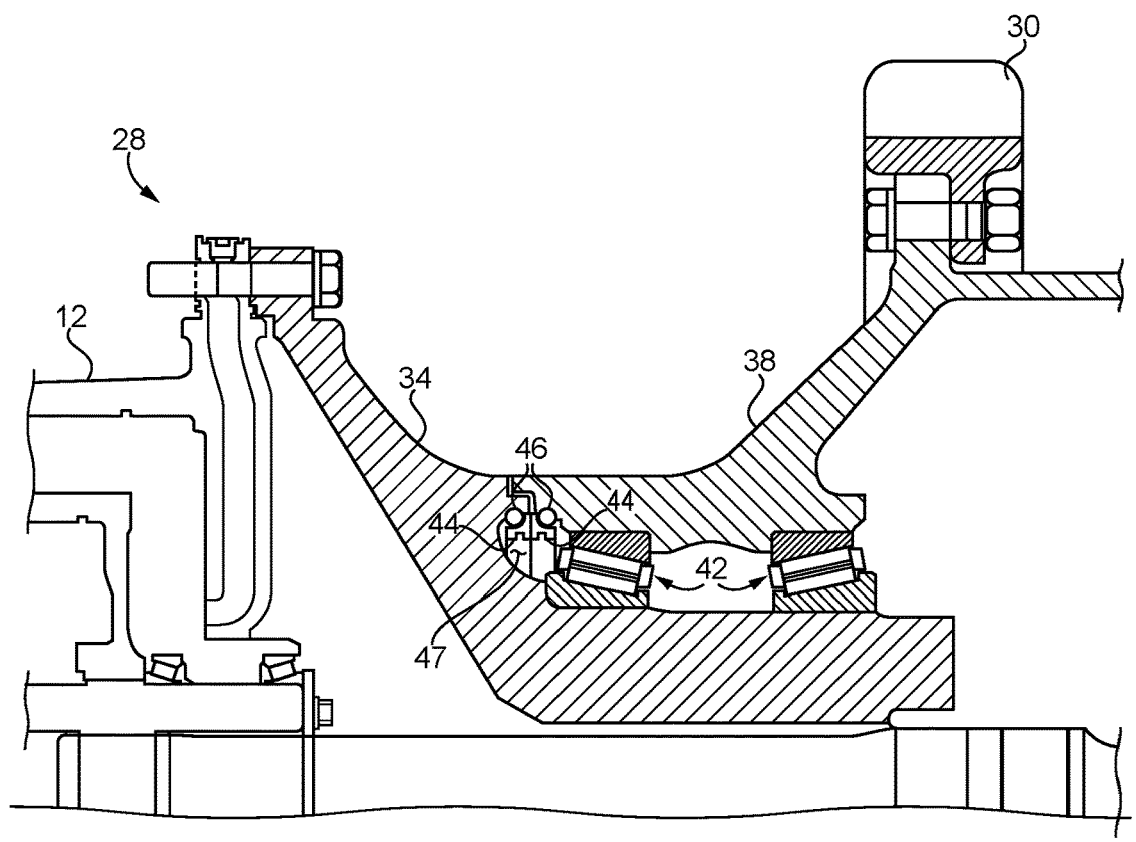
FIG. 3 is another sectioned view of the machine system of FIG. 2.

Referring also to FIG. 2, there is shown final drive machine system 28 in further detail and illustrating drive sprocket 30 mounted upon or coupled with a sprocket housing 38, and cut away to illustrate internal gearing 32 that transfers rotation of a driveshaft or spindle 36 that extends through a drive housing 34 to sprocket 30. Those skilled in the art will be familiar with the general manner of providing rotational power to a driveshaft, axle, rotor, auger, pump, compressor, or a variety of other rotatable machine system components as well as the desirability of providing fluid seals in connection therewith. To this end, final drive machine system 28 also includes a face seal assembly 40. Referring also now to FIG. 3, there is shown another sectioned view of final drive machine system 28 illustrating drive housing 34 coupled to frame 12, and rotatably coupled with sprocket housing 38 by way of a plurality of bearings 42. Formed between sprocket housing 38 and drive housing 34 is a seal cavity 47 that contains lubricating fluid or grease, for example. Also positioned between sprocket housing 38 and drive housing 34 is face seal assembly 40. During rotating sprocket housing 38 and sprocket 30 relative to drive housing 34 face seal assembly 40 provides a rotatable fluid-tight or substantially fluid-tight sealing interface that contains lubricating fluid or the like within seal cavity 47, potentially pressurized lubricating fluid, and prevents entry of debris or the like.

Those skilled in the art will be familiar with the rugged operating environments and harsh conditions that can be experienced by machinery such as final drive machine system 28 and others. Accordingly, bending loads, torsional loads on housing components, axial loads, and still other factors may be experienced that make robust sealing and resistance to performance degradation desirable. In the illustrated example, face seal assembly 40 includes a first metallic sealing ring 44 and a second metallic sealing ring 44, a first non-metallic sealing element 46 and a second non-metallic sealing element 46 positioned, respectively, upon the first and the second metallic sealing rings 44. The first non-metallic sealing element, such as the left non-metallic sealing element 46 in FIG. 3, forms a first static seal between first metallic sealing ring 44, such as the left metallic sealing ring 44, and a first machine component such as drive housing 34 or a separate seal housing. The second non-metallic sealing element 46 forms a second static seal between the second metallic sealing element, such as the right metallic sealing element in FIG. 3, and a second machine component such as sprocket housing 38 or a separate seal housing. First and second metallic sealing rings 44 may be biased in contact with one another by way of elastic deformation of first and second sealing elements 46 to provide a rotatable metal face seal as further discussed herein.

First and second metallic sealing rings 44 may be identical to one another, and first and second non-metallic sealing elements 46 may be identical to one another, however, the present disclosure is not thereby limited. In other instances, two metallic sealing rings in a face seal assembly might have different configurations, such as a so-called inverted sealing ring configuration. Non-metallic sealing elements 46 may be so-called torics, and could be O-rings formed of a rubber or rubber-like polymeric material, including nitrile, silicone, fluoroelastomer or still others. Other non-metallic materials, and sealing elements having shapes other than O-ring shapes, could be used in other embodiments. Rather than sealing rings forming fluid seals with one another, embodiments are contemplated where a different machine component such as a housing component forms a face seal with a metallic sealing ring. In a practical implementation strategy, first and second metallic sealing rings 44 include nickel or an alloy of nickel and iron. One typical material composition includes a majority of nickel, with iron, chromium and/or other materials making up the balance. One family of cast iron and nickel alloy materials includes materials commercially available as Ni-hard. First and second metallic sealing rings 44 might be cast, forged, 3-D printed, or formed by any other suitable process to produce a one-piece metallic sealing ring.

Those skilled in the art will be familiar with machinability characteristics of different metallic materials. A component formed of nickel or a nickel and iron alloy, for example, or where a nickel or nickel-based facing is used, can be challenging to machine to certain properties, shapes, or tolerances, given a tendency for the material to smear or otherwise be moved around instead of being cut or ground away in at least some instances. It has been observed that in the case of nickel or metal face seals including nickel, machinability properties of metallic sealing rings can make it difficult to form metal sealing faces to a desired relative planarity or flatness. As a result, it has been observed that such metal face seals that depart from what would otherwise be a desired flatness or planarity can be susceptible to leakage of lubricating fluid or intrusion of foreign matter. For instance, when one or more of the metal face seals in a seal assembly is less than ideally planar or flat, rotation of the metal face seal against another metal face seal can actually produce a varying interface between the contacting components where peaks and valleys in the face seal profiles can cancel one another out, align in phase with one another, or align out of phase with one another, in general producing a sealing interface that is non-uniform and dynamic. In some instances, metal face seals formed of materials other than nickel can exhibit similar behavior and challenges. As will be further apparent from the following description, the present disclosure addresses these and other concerns.

Figure 4:
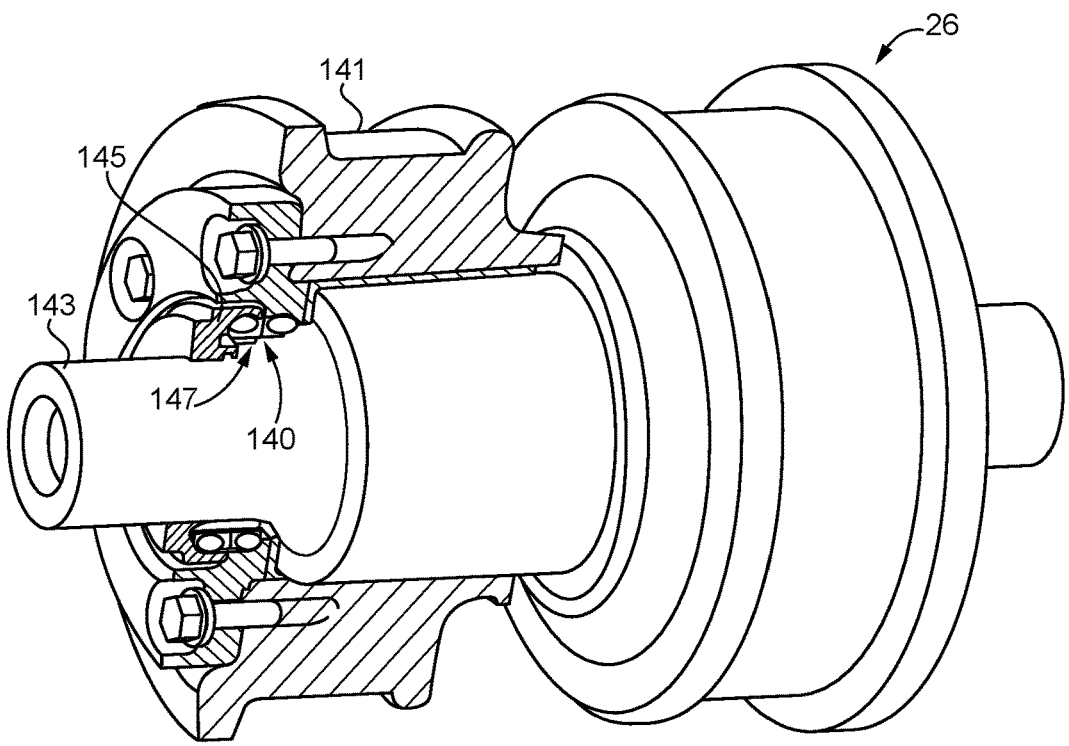
FIG. 4 is a partially sectioned diagrammatic view of another machine system, according to another embodiment.

Referring to FIG. 4, there is shown a track roller or track roller assembly 26 including a roller body 141 positioned upon and rotatable about a roller shaft 143. Roller shaft 143 can extend through a collar or other machine component 145, and a face seal assembly 140 can be positioned between collar 145 and roller body 141 to maintain lubricating fluid within a seal cavity 147. As alluded to above, sealing within and amongst components in a track system, such as within components of a track roller assembly or a track pin, is one group of applications contemplated for the present disclosure.

Figure 5:
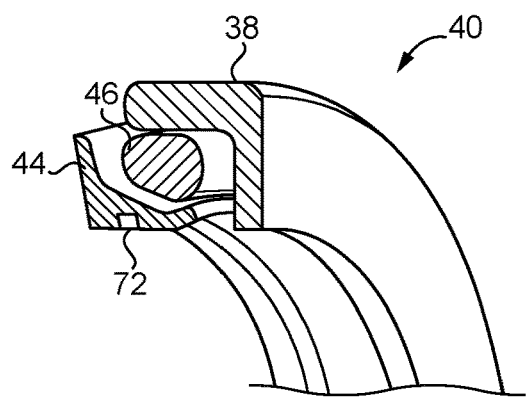
FIG. 5 is a sectioned view, in perspective, of a face seal assembly, according to one embodiment.
Figure 6:
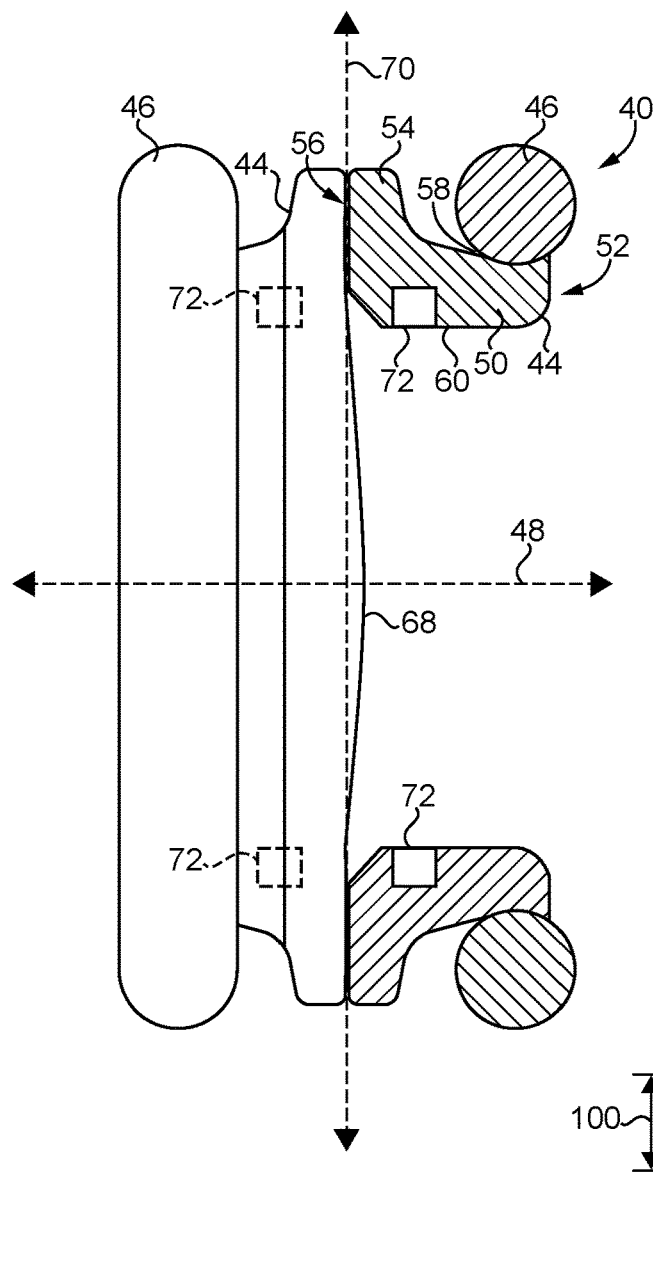
FIG. 6 is a partially sectioned side diagrammatic view of a face seal assembly, according to one embodiment.

Referring also now to FIG. 5 and FIG. 6, there are shown other views of face seal assembly 40 including a single metallic sealing ring 44 and a single non-metallic sealing element 46, shown in an elastically deformed state in FIG. 5. In FIG. 6, face seal assembly 40 is shown as it might appear where two metallic sealing rings 44 and two non-metallic sealing elements 46 are used, with components on the right-hand side of FIG. 6 shown sectioned approximately by way of a section plane extending through a center axis 48 defined by metallic sealing rings 44. It will be appreciated that center axis 48 can be a common center axis for coaxial first and second metallic sealing rings 44. Description herein of features of a metallic sealing ring 44 in the singular shall be understood to refer by way of analogy to other sealing rings contemplated within the scope of the present disclosure, and multiple sealing rings within the same face seal assembly, depending upon the context.

Figure 7:
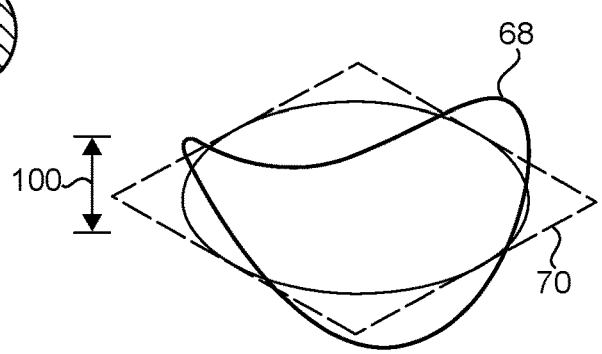
FIG. 7 is a diagrammatic illustration of an out-of-plane state of a sealing face in a metallic sealing ring, according to one embodiment.

Metallic sealing ring 44 defines center axis 48 and includes an axially extending body portion 50 forming a first axial end 52 of metallic sealing ring 44, and a radially extending flange 54 joined to axially extending body portion 50 and forming a second axial end 56 of metallic sealing ring 44. Metallic sealing ring 44 further includes an outer ring surface 58 and an inner ring surface 60 each formed at least in part upon axially extending body portion 50 and extending circumferentially around center axis 48. Non-metallic sealing element 46 is positioned upon outer ring surface 58. Second axial end 56 includes a sealing face 68 facing an axially outward direction and extending circumferentially around center axis 48 in a path that varies from parallelism with a plane 70 that is oriented normal to center axis 48. In the context of the present disclosure the term "axially outward" should be understood to refer to a direction along an axis that is away from an axial midpoint of a subject component. "Axially inward" is in turn understood to mean a direction along the axis that is toward the axial midpoint. In FIG. 6 it can be seen that sealing face 68 of the left metallic sealing ring 44 has a non-uniform profile with respect to plane 70. Referring also to FIG. 7, there is shown a diagrammatic illustration of sealing face 68 as it might appear in comparison with plane 70, and whereby it can be noted that sealing face 68 varies from parallelism with plane 70, in particular varying by an out-of-flat magnitude 100. Magnitude 100 represents a peak-to-valley distance measured in a direction parallel to center axis 48, and may be about 10 millimeters or 1000 microns, or less. In some instances, and for some sealing rings the peak-to-valley distance/magnitude 100 might be about 0.2 millimeters or about 200 microns, or less. The varying of the path of the sealing face can further be understood to define a range, in axial directions, of about 1000 microns, or less. The varying of the path will in any event depend upon factors such as how and of what materials the subject sealing ring is manufactured, for instance nickel-based versus non-nickel-based or cast versus printed, and the extent to which-if at all-sealing face 68 is machined. Given that certain sealing rings and sealing ring materials may be better suited than others to achieving optimal specifications, in at least certain applications the present disclosure can reduce or potentially even eliminate the need for machining sealing face 68 to seek planarity within relatively tight tolerances. Sealing face 68 can exhibit the subject non-planarity/deflection discussed herein at standard temperature and pressure conditions, and when at rest, in other words not axially or otherwise compressed or biased. The term "about" can be understood herein in the context of conventional rounding to a consistent number of significant digits. Accordingly. "about 1" means from 0.5 to 1.4, "about 0.2" means from 0.15 to 0.24, and so on.

Figure 8:
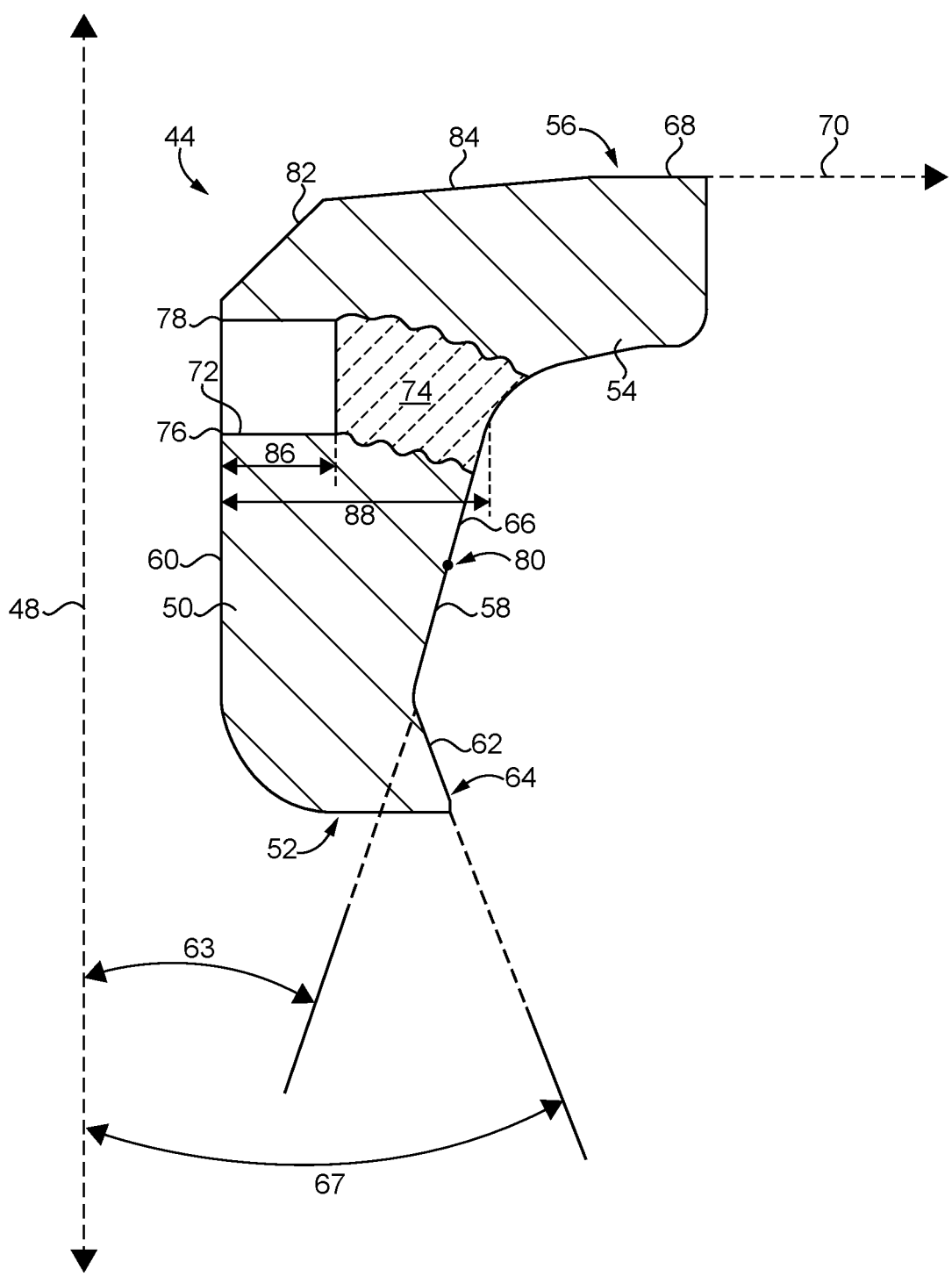
FIG. 8 is a sectioned view through a metallic sealing ring, according to one embodiment.

Referring also now to FIG. 8, outer ring surface 58 has a first section 62 forming a seal retention lip 64, and a second section 66 extending between first section 62 and radially extending flange 54. In an implementation, first section 62 includes a first conical section and defines a first angle 63 that opens in a first axial direction toward first axial end 52. Second section 66 may include a second conical section and defines a second angle 67 that opens in a second axial direction toward second axial end 56. Angle 67 and angle 63 might be substantially equal to one another, and from about 5° to about 20° although the present disclosure is not thereby limited. Angle 67 and/or angle 63 could be 0° angles in some embodiments. Angle 63 and angle 67 can each include acute angles. In other instances, sections 64 and 66 might not be conical, but could instead be spherical or another shape. Section 66 can provide a ramp surface that assists in compressing non-metallic sealing element 46 between metallic sealing ring 44 and a machine component as discussed herein. Metallic sealing ring 44 may further include a chamfer 82 extending circumferentially around center axis 48 and between sealing face 68 and inner ring surface 60. Inner ring surface 60 may be cylindrical. Sealing face 68 is formed on flange 54, and faces the second axial direction or an axially outward direction and extends circumferentially around center axis 48. A tapered wear face 84 can include sacrificial wear material that begins to engage against an adjacent metallic sealing ring 44 as material is worn away from sealing face 68. Wear face 84 could be conical, or another shape, and is adjacent to sealing face 68, and extends circumferentially around center axis 48. Chamfer 82 is adjacent to wear face 84 and extends circumferentially around center axis 48.

Face seal assembly 40 and metallic sealing ring 44 further include a stiffness relief groove 72 extending inwardly from inner ring surface 60 and circumferentially around center axis 48. Stiffness relief groove 72 can be understood to extend inwardly into material of body portion 50, in other words a radially outward direction in reference to center axis 48. Stiffness relief groove 72 forms an annular spring zone 74 of reduced material thickness in body portion 50 to compensate for the varying of the path of sealing face 68. It will be recalled that sealing face 68 can traverse a circumferential path around center axis 48 that varies in axial location, thus varying from parallelism with plane 70, potentially dipping through and then back out of plane 70. Spring zone 74 is considered to enable elastic deformation of metallic sealing ring 44 in a manner akin to elastic deformation of other types of springs. Parts of metallic sealing ring 44 on a first side of groove 72 can rotate relatively mildly, during deformation of spring zone 74, relative to parts of metallic sealing ring 44 on an opposite side of groove 72. The location, shape and relative extent of spring zone 74 depicted in FIG. 8 is illustrative only, and will vary based on design configuration of stiffness relief groove itself. Stiffness relief groove 72 may extend substantially entirely around a circumference of inner ring surface 60, although in other embodiments it could be discontinuous or only partly circumferential. In a practical implementation strategy section 66 of outer ring surface 58 has an axial midpoint 80. Stiffness relief groove 72 may be located axially between axial midpoint 80 and second axial end 56 of metallic sealing ring 44. More particularly, stiffness relief groove 72 may be located axially between axial midpoint 80 and sealing face 68, and in a typical application between axial midpoint 80 and tapered wear face 84. In embodiments where chamfer 82 is provided stiffness relief groove 72 may be located outside of chamfer 82. It can also be noted that stiffness relief groove 72 is located axially between axial midpoint 80 and chamfer 82. Depending upon application and sealing ring design, and potentially also depending upon the relative extent to which a sealing face in a metallic sealing ring according to the present disclosure departs from planarity, a relative depth of stiffness relief groove 72 can vary. In one practical implementation strategy a depth of stiffness relief groove 72 is shown via reference numeral 86 in FIG. 8, and a radial thickness between inner ring surface 60 and outer ring surface 62 is shown at reference numeral 88. Depth 86 of stiffness relief groove 72 may be about 75% or less of radial thickness 88, and in some embodiments about 50% or less of radial thickness 88, where radial thickness 88 and depth 86 are measured at approximately the same axial location. A first edge 76 is formed between stiffness relief groove 72 and inner ring surface 60 at a first axial location, and a second edge 78 is formed between stiffness relief groove 72 and inner ring surface 60 at a second axial location. Edge 76 and edge 78 are features that are evident based upon relative relation to adjoining surfaces of metallic sealing ring 44. In other words, a smooth and curved transition from chamfer 82 to first axial end 52, even if a varying radial thickness is produced, is not likely fairly understood to include a stiffness relief groove having edges at differing axial locations as those terms are intended to be understood herein. Stiffness relief groove 72 can be square or squarish or rectangular in cross section, but could instead have rounded or radiused transitions with adjoining inner ring surface 60, a rounded bottom of the groove, and/or an asymmetric shape about an axial section plane, or even circumferentially about center axis 48. As noted above depth 86 of stiffness relief groove 72 can also vary, and could depend at least in part upon the relative axial location. A stiffness relief groove depth in an embodiment where the stiffness relief groove is shifted relatively closer to axial midpoint 80 than what is shown in FIG. 8 would likely have a lesser depth to achieve a desired spring constant in spring zone 74 than in the embodiment depicted in FIG. 8, although the present disclosure is not thereby limited. Depth 86 might be from about 1 millimeter to about 25 millimeters.

INDUSTRIAL APPLICABILITY

Referring to the drawings generally, but in particular now to FIGS. 1, 2, and 3, when sprocket 30 is rotated in final drive machine system 28 sprocket housing 38 will rotate in proportion to rotation of spindle 36 relative to drive housing 34, supported upon bearings 42, for example. Gearing 32 may be operated to reduce a speed and increase a torque of drive sprocket 30 on track 24 relative to a speed of rotation and torque of spindle 36. The opposed and contacting sealing faces 68 within face seal assembly 40 will rotate in contact with one another to maintain fluid sealing of lubricating fluid or the like within seal cavity 47. It will be further appreciated that a first inner ring surface 60 of a first metallic sealing ring and a second inner ring surface 60 of the second metallic sealing ring 44 in face seal assembly 40 will form wetted walls of seal cavity 47. As peaks and/or valleys of the interfacing sealing surfaces 68 rotate relative to one another, the elastic deformability provided by spring zone 74 can allow the subject sealing faces 68 to move generally relative to center axis 48 to maintain contact or maintain tighter contact with one another, and in general improve followability of one sealing face 68 relative to the other. Relatively higher lubricating fluid pressures than in other designs may also be employed.

The present description is for illustrative purposes only, and should not be construed to narrow the breadth of the present disclosure in any way. Thus, those skilled in the art will appreciate that various modifications might be made to the presently disclosed embodiments without departing from the fill and fair scope and spirit of the present disclosure. Other aspects, features and advantages will be apparent upon an examination of the attached drawings and appended claims. As used herein, the articles "a" and "an" are intended to include one or more items, and may be used interchangeably with "one or more." Where only one item is intended, the term "one" or similar language is used. Also, as used herein, the terms "has." "have," "having," or the like are intended to be open-ended terms. Further, the phrase "based on" is intended to mean "based, at least in part, on" unless explicitly stated otherwise.

What is claimed is:

1. A face seal assembly for a machine system comprising:
   a metallic sealing ring defining a center axis and including an axially extending body portion forming a first axial end of the metallic sealing ring, and a radially extending flange joined to the axially extending body portion and forming a second axial end of the metallic sealing ring;
   the metallic sealing ring further including an outer ring surface and an inner ring surface each formed at least in part upon the axially extending body portion and extending circumferentially around the center axis;
   the outer ring surface having a first section forming a seal retention lip, and a second section extending between the first section and the radially extending flange;
   a non-metallic sealing element positioned upon the outer ring surface;
   the second axial end including a sealing face facing an axially outward direction and extending circumferentially around the center axis in a path that varies from parallelism with a plane that is oriented normal to the center axis; and
   a stiffness relief groove extending inwardly from the inner ring surface and circumferentially around the center axis and forming an annular spring zone of reduced material thickness in the body portion to compensate for the varying of the path of the sealing face.

2. The face seal assembly of claim 1 wherein the metallic sealing ring includes nickel or an alloy of nickel and iron.

3. The face seal assembly of claim 1 wherein a first edge is formed between the stiffness relief groove and the inner ring surface at a first axial location, and a second edge is formed between the stiffness relief groove and the inner ring surface at a second axial location.

4. The face seal assembly of claim 2 wherein the first section of the outer ring surface includes a first conical section that defines a first angle that opens in a direction of the first axial end, and the second section of the outer ring surface includes a second conical section that defines a second angle that opens in a direction of the second axial end.

5. The face seal assembly of claim 4 wherein the second conical section has an axial midpoint, and the stiffness relief groove is located axially between the axial midpoint and the second axial end of the metallic sealing ring.

6. The face seal assembly of claim 5 wherein the metallic sealing ring further includes a tapered wear face extending circumferentially around the center axis and between the sealing face and the inner ring surface, and wherein the stiffness relief groove is located axially between the axial midpoint and the tapered wear face.

7. The face seal assembly of claim 6 wherein a depth of the stiffness relief groove is about 75% or less of a radial thickness between the inner ring surface and the outer ring surface.

8. The face seal assembly of claim 7 wherein the stiffness relief groove extends substantially entirely around a circumference of the inner ring surface.

9. The face seal assembly of claim 1 further comprising a second metallic sealing ring having a second inner ring surface and a second annular sealing face in contact with the first annular sealing face, such that the first inner ring surface and the second inner ring surface form wetted walls of a seal cavity.

10. A machine system comprising:
a first machine component;
a second machine component rotatable relative to the first machine component;
a face seal assembly including a first metallic sealing ring, and a first non-metallic sealing element forming a first static seal between the first metallic sealing ring and the first machine component, and further including a second metallic sealing ring, and a second non-metallic sealing element forming a second static seal between the second metallic sealing ring and the second machine component;
each of the first and the second metallic sealing rings including an inner ring surface extending circumferentially around a center axis common to the first and the second metallic sealing rings, an outer ring surface, and a sealing face; and
the sealing faces of the first and the second metallic sealing rings extending circumferentially around the center axis and being in contact with one another so as to form a rotatable face seal, and at least one of the first or the second metallic sealing rings having a stiffness relief groove formed in the corresponding inner ring surface that compensates for varying of paths of the sealing faces from parallelism with a plane that is oriented normal to the center axis.

11. The machine system of claim 10 wherein:
the first and the second metallic sealing rings are substantially identical to one another; and
the outer ring surface of each of the first and the second metallic sealing rings includes a first section that forms a seal retention lip and defines a first angle that opens in a first axial direction, and a second section that defines a second angle that opens in a second axial direction.

12. The machine system of claim 11 wherein:
the first and the second metallic sealing rings each further include a tapered wear face extending circumferentially around the center axis, and between the corresponding sealing face and inner ring surface;
the second section has an axial midpoint, and the stiffness relief groove is located axially between the corresponding axial midpoint and tapered wear face; and
a depth of the stiffness relief groove is about 75% or less of a radial thickness between the corresponding inner ring surface and outer ring surface.

13. The machine system of claim 12 wherein the first and the second metallic sealing rings each include nickel or an alloy of nickel and iron.

14. The machine system of claim 11 comprising a final drive machine system for a ground-engaging machine.

15. A metallic sealing ring for a face seal assembly in a machine system comprising:
a body portion including an inner ring surface and an outer ring surface extending circumferentially around a center axis;
a flange joined to the body portion and extending radially outward from the body portion;
the outer ring surface having a first section oriented at a first angle relative to the center axis that opens in a first axial direction away from the flange, and a second section extending between the first section and the flange and oriented at a second angle relative to the center axis that opens in a second axial direction toward the flange;
a sealing face formed on the flange, the sealing face facing the second axial direction and extending circumferentially around the center axis;
a tapered wear face adjacent to the sealing face, the tapered wear face extending circumferentially around the center axis; and
a stiffness relief groove extending inwardly from the inner ring surface and circumferentially around the center axis, such that an annular spring zone of reduced material thickness is formed in the body portion to compensate for varying in a path of the sealing face from parallelism with a plane that is oriented normal to the center axis.

16. The metallic sealing ring of claim 15 wherein the inner ring surface is cylindrical, and wherein a first edge is formed between the stiffness relief groove and the inner ring surface at a first axial location and a second edge is formed between the stiffness relief groove and the inner ring surface at a second axial location.

17. The metallic sealing ring of claim 16 wherein the second section of the outer ring surface includes an axial midpoint, and the stiffness relief groove is located axially between the axial midpoint and the tapered wear face.

18. The metallic sealing ring of claim 17 wherein the metallic sealing ring is one piece and formed of nickel or an alloy of nickel and iron.

19. The metallic sealing ring of claim 18 wherein the varying of the path of the sealing face defines a range, in axial directions, of about 1000 microns, or less.

* * * * *